US007503338B2

(12) United States Patent
Harrington et al.

(10) Patent No.: US 7,503,338 B2
(45) Date of Patent: Mar. 17, 2009

(54) REMOTE CONTROL FOR HOSE OPERATION

(75) Inventors: Jeffrey M. Harrington, Vancouver, WA (US); Martin Koebler, San Francisco, CA (US); Norbert Kozar, Redwood City, CA (US); Ramon A. Caamano, Gilroy, CA (US); Michael J. Lee, Center Ossipee, NH (US)

(73) Assignee: Great Stuff, Inc., Austin, TX (US)

( * ) Notice: Subject to any disclaimer, the term of this patent is extended or adjusted under 35 U.S.C. 154(b) by 342 days.

(21) Appl. No.: 10/799,362

(22) Filed: Mar. 12, 2004

(65) Prior Publication Data

US 2004/0231723 A1    Nov. 25, 2004

Related U.S. Application Data

(60) Provisional application No. 60/455,229, filed on Mar. 13, 2003.

(51) Int. Cl.
*B65H 75/34* (2006.01)
*F16K 31/02* (2006.01)

(52) U.S. Cl. .............................. 137/355.2; 251/129.04; 137/355.16

(58) Field of Classification Search ............ 137/624.11, 137/355.19, 355.16–355.18, 355.2, 355.26; 251/129.04, 129.05
See application file for complete search history.

(56) References Cited

U.S. PATENT DOCUMENTS

| 2,276,714 | A | 3/1942 | Brown |
| 2,518,990 | A | 8/1950 | Keener |
| 2,607,360 | A | 8/1952 | Young |
| 2,621,870 | A | 12/1952 | Barton |
| 2,898,605 | A | 8/1959 | Pearson |
| 3,011,469 | A | 12/1961 | Dallas |
| 3,471,885 | A | 10/1969 | Cafaro et al. |
| 3,786,869 | A | 1/1974 | McLoughlin |
| 3,910,497 | A | 10/1975 | Manor |
| 3,911,955 | A | 10/1975 | Link |

(Continued)

FOREIGN PATENT DOCUMENTS

DE        201 09 674 U1    8/2001

(Continued)

OTHER PUBLICATIONS

International Search Report Mailed Jun. 28, 2005 in Corresponding PCT Application No. PCT/US2005/006679.

(Continued)

*Primary Examiner*—John Rivell
*Assistant Examiner*—Cloud K Lee
(74) *Attorney, Agent, or Firm*—Knobbe Martens Olson & Bear LLP

(57) ABSTRACT

A hose control system comprising a receiver and a transmitter by which one can remotely control both the flow of water through a hose and the winding or unwinding of the hose onto a reel. The system preferably has power saving advantages, for example, by the use of a power control unit that reduces the power consumed by the electronics of the devices, but does not unreasonably disrupt the use of the devices. The receiver may be used with different aspects or all of the hose control system.

34 Claims, 10 Drawing Sheets

U.S. PATENT DOCUMENTS

| | | | |
|---|---|---|---|
| 3,943,312 A | 3/1976 | Bernstein et al. | |
| 3,974,879 A | 8/1976 | Nelson, Jr. et al. | |
| 4,012,002 A | 3/1977 | McDonald et al. | |
| 4,142,367 A | 3/1979 | Guisti | |
| 4,186,881 A | 2/1980 | Long | |
| 4,276,482 A | 6/1981 | Crockett | |
| 4,276,900 A | 7/1981 | Rosenqvist | |
| 4,352,025 A | 9/1982 | Troyen | |
| 4,392,063 A | 7/1983 | Lindquist | |
| 4,488,055 A | 12/1984 | Toyama | |
| 4,513,772 A | 4/1985 | Fisher | |
| 4,533,835 A | 8/1985 | Beckwith | |
| 4,538,761 A | 9/1985 | Ruprechter et al. | |
| 4,572,228 A * | 2/1986 | Larson et al. | 137/15.11 |
| 4,588,318 A | 5/1986 | O'Brien et al. | |
| 4,730,637 A * | 3/1988 | White | 137/62 |
| 4,731,545 A | 3/1988 | Lerner et al. | |
| 4,746,808 A | 5/1988 | Kaeser | |
| 4,832,074 A | 5/1989 | Li | |
| 4,839,039 A | 6/1989 | Parsons et al. | |
| 4,845,418 A * | 7/1989 | Conner | 318/778 |
| 4,858,827 A | 8/1989 | Fletcher et al. | |
| 4,960,181 A * | 10/1990 | Marin et al. | 181/106 |
| 5,078,476 A | 1/1992 | Shin | |
| 5,249,631 A | 10/1993 | Ferren | |
| 5,385,297 A | 1/1995 | Rein et al. | |
| 5,402,551 A | 4/1995 | Workhoven | |
| 5,427,350 A | 6/1995 | Rinkewich | |
| 5,445,176 A | 8/1995 | Goff | |
| 5,482,250 A * | 1/1996 | Kodaira | 251/129.04 |
| 5,495,995 A | 3/1996 | Dominique et al. | |
| 5,651,384 A * | 7/1997 | Rudrich | 137/1 |
| 5,715,866 A | 2/1998 | Granger | |
| 5,813,655 A | 9/1998 | Pinchott et al. | |
| 5,881,775 A | 3/1999 | Owen et al. | |
| 5,947,148 A | 9/1999 | DeVito | |
| 6,017,017 A * | 1/2000 | Lutz et al. | 251/129.15 |
| 6,036,333 A | 3/2000 | Spiller | |
| 6,092,548 A | 7/2000 | DeVito | |
| 6,144,840 A * | 11/2000 | Alton et al. | 455/343.3 |
| 6,149,096 A | 11/2000 | Hartley | |
| 6,178,992 B1 * | 1/2001 | Van Der Paal | 137/355.2 |
| 6,236,850 B1 * | 5/2001 | Desai | 455/343.2 |
| 6,279,848 B1 | 8/2001 | Mead, Jr. | |
| 6,283,139 B1 | 9/2001 | Symonds et al. | |
| 6,337,635 B1 | 1/2002 | Ericksen et al. | |
| 6,371,148 B1 | 4/2002 | Tripp | |
| 6,491,062 B1 | 12/2002 | Croft | |
| 6,561,481 B1 | 5/2003 | Filonczuk | |
| 6,568,655 B2 * | 5/2003 | Paese et al. | 251/129.04 |
| 6,631,882 B2 * | 10/2003 | Mack | 251/129.04 |
| 6,662,821 B2 * | 12/2003 | Jacobsen et al. | 137/312 |
| 6,666,431 B2 | 12/2003 | McCusker | |
| 6,668,329 B1 * | 12/2003 | Rudd et al. | 713/320 |
| 6,701,951 B1 | 3/2004 | Drinkwater | |
| 6,752,342 B1 | 6/2004 | Nagler | |
| 6,796,515 B2 | 9/2004 | Heren et al. | |
| 6,935,575 B2 | 8/2005 | Lacchia | |
| RE39,249 E | 8/2006 | Link, Jr. | |
| 7,097,113 B2 | 8/2006 | Ivans | |
| 7,147,204 B2 | 12/2006 | Hollingsworth et al. | |
| 7,191,964 B2 | 3/2007 | Trapp | |
| 7,201,332 B2 | 4/2007 | Wang et al. | |
| 7,258,285 B1 | 8/2007 | Combs et al. | |
| 7,308,724 B2 | 12/2007 | Ho | |
| 7,311,004 B2 | 12/2007 | Giles | |
| 7,316,368 B2 | 1/2008 | Moon et al. | |
| 2002/0166986 A1 | 11/2002 | Remby et al. | |
| 2003/0116670 A1 | 6/2003 | Gentry | |
| 2004/0100394 A1 | 5/2004 | Hitt | |
| 2004/0217189 A1 | 11/2004 | Regli | |
| 2005/0029477 A1 | 2/2005 | Wolf | |
| 2005/0167625 A1 | 8/2005 | Deen | |
| 2005/0199842 A1 | 9/2005 | Parsons et al. | |

FOREIGN PATENT DOCUMENTS

| | | |
|---|---|---|
| DE | 202004016452 | 4/2005 |
| DE | 102005042701 | 3/2007 |
| EP | 0 214 452 | 6/1989 |
| EP | 0 509 151 A | 10/1992 |
| EP | 873920 A2 | 10/1998 |
| FR | 2823417 | 10/2002 |
| JP | 05028046 | 2/1993 |
| JP | 92-86570 | 11/1997 |
| JP | 2002199821 | 7/2002 |
| KR | 2002-0041060 | 6/2002 |
| SU | 1087120 | 4/1984 |
| WO | WO 97/03917 | 2/1997 |
| WO | WO 03/026995 A | 4/2003 |
| WO | WO 2006042127 | 8/2006 |

OTHER PUBLICATIONS

Office Action dated Apr. 11, 2008, received in Chinese Application No. 200480012827.9, and English translation.

Office Action dated Mar. 7, 2008, received in Indian Application No. 4358/DELNP/2005.

U.S. Appl. No. 12/036,154, filed Feb. 22, 2008, Tracey et al.

Lang et al., "Mechatronic design of a leather spray system," Mechatronics, vol. 9, Issue 7, pp. 867-880 (Oct. 1999).

* cited by examiner

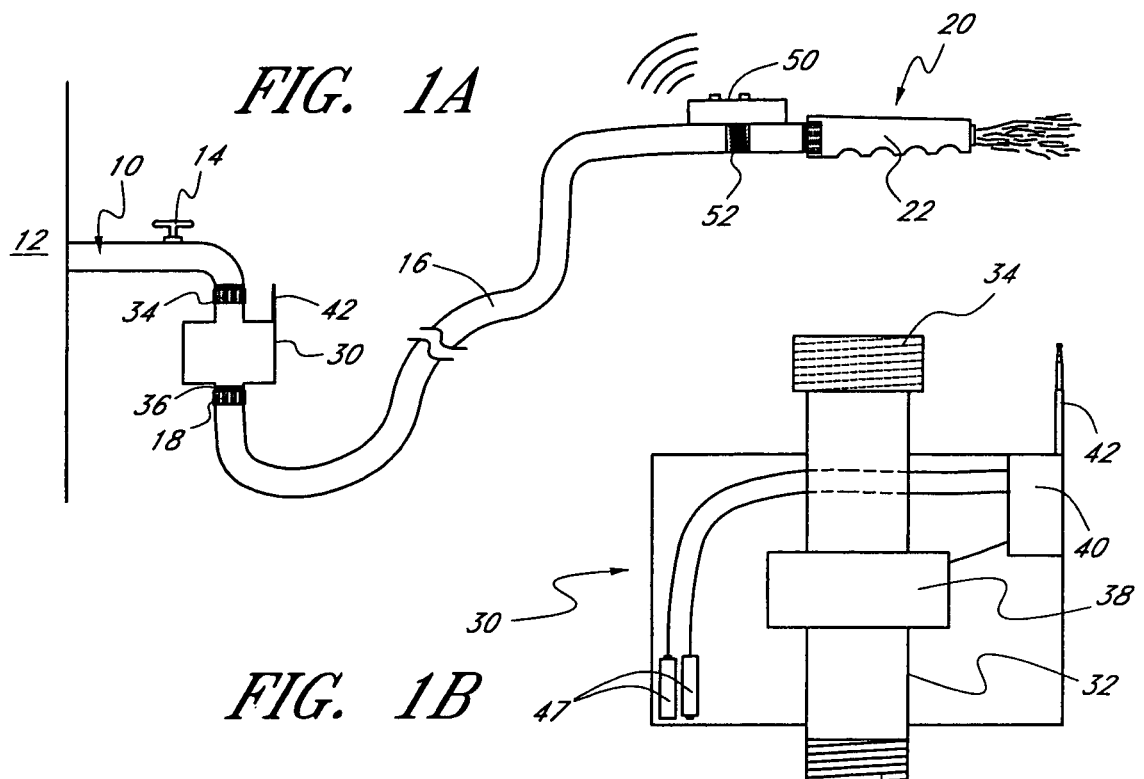
FIG. 1A
FIG. 1B
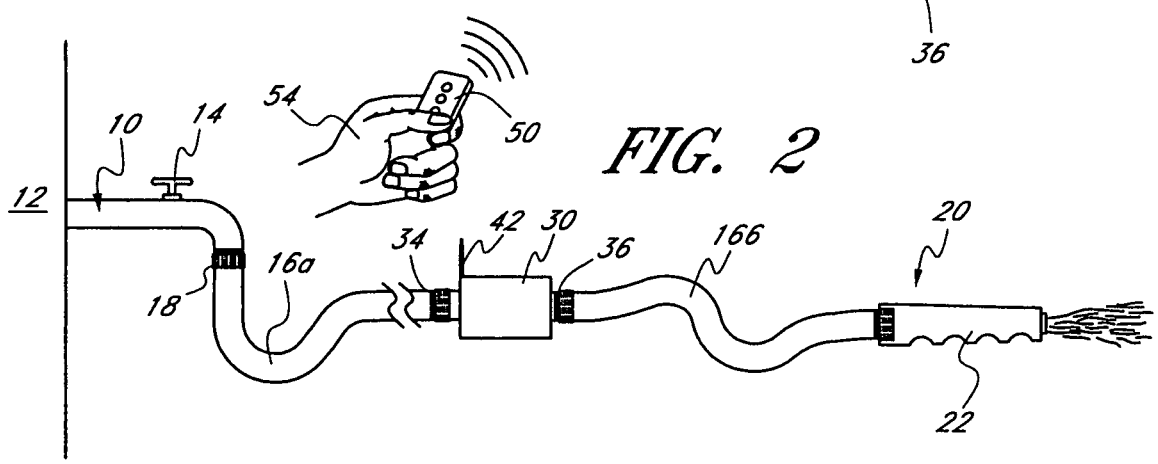
FIG. 2
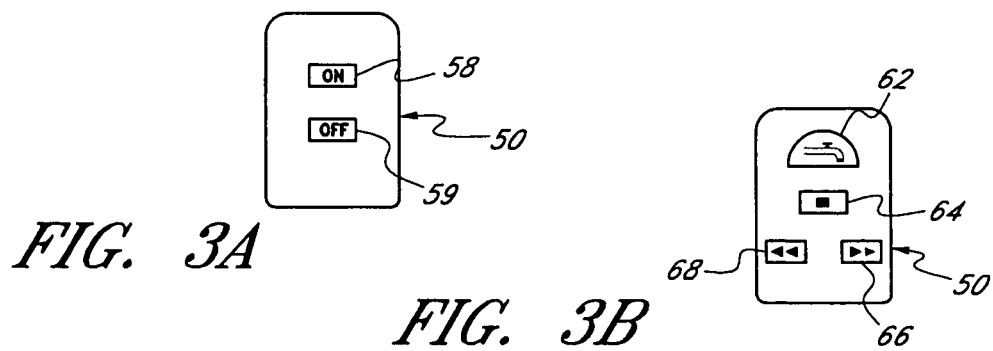
FIG. 3A
FIG. 3B

REMOTE CONTROL FOR HOSE OPERATION

CLAIM FOR PRIORITY

This application claims priority of U.S. Provisional Applications No. 60/455,229 filed on Mar. 13, 2003. This application is herein incorporated by reference but is not admitted to be prior art.

FIELD OF THE INVENTION

This invention relates generally to hose systems and more particularly to controlling fluid flow and reel operations of hose systems. The invention further relates to power saving aspects of the same.

BACKGROUND OF THE INVENTION

Hoses are typically used in conjunction with on/off valves positioned at a distal or proximal end of the hose. For example, garden hoses are fitted to a faucet on the outside of a house or other building, with a traditional manual spigot or valve for turning the water flow on or off at the faucet. Because the hose is designed to extend many yards away from the faucet, it is often convenient to have a means for turning the flow on or off at the distal or spray nozzle end of the hose. Thus, many manual devices such as spray guns are provided for fitting at the nozzle end of the hose so that the flow can be turned on or off without repeatedly returning to the faucet.

Despite the availability of attachments for turning the flow on or off at the nozzle end, it is generally undesirable to leave the water flow on at the source when the hose is no longer in use. Continual water pressure along the entire length of the hose is undesirable for a number of reasons. The pressure tends to form leakage paths at joints between multiple lengths of hose, at the joint between the nozzle and the nozzle attachment (such as a spray gun), and at the joint between the faucet and the hose. Furthermore, continual pressure can also form leaks along the hose line itself. Constant leakage at these points leads to flooded or muddied garden areas, particularly near the faucet where the user has to go to turn the water on or off. Moreover, it is difficult to manipulate the hose, move it from place to place or coil the hose for storage with constant pressure along the hose line. This leads the user to turn off the water flow at the source, e.g., by the manual spigot on the outside faucet. However, it is often inconvenient to reach the faucet. Often the faucet is obstructed or difficult to reach and the area around the faucet tends to be muddied by water leakage.

These problems have been addressed to some extent by providing a remotely controllable, electrically actuated valve or flow controller in the hose, the valve positioned to selectively open and close a fluid flow path through the hose via a remote control. However, there are power consumption issues that limit the use of remotely controlled devices. Remote control systems generally involve a remote transmitter powered by a battery, or low power source, and the unit to be controlled. The unit to be controlled is connected to a receiver that is usually powered by a continuous power source, rather than a battery. Thus, while the remote transmitter is typically powered by batteries and thus truly "wireless," the receiver is usually connected to a larger, or continuous, source of power by a wire. The reason the transmitter can operate from a battery, or low power source, is because a transmitter only needs to draw power when it transmits a wireless signal to the receiver; thus, the transmitter does not need to draw power at all times. On the other hand, the receiver cannot function in this way because it does not know when a command will be sent to it. In other words, in traditional arrangements, the receiver must continuously monitor for incoming signals and, therefore, must be on at all times. The power that is needed to continuously monitor for an incoming signal would normally drain a battery in a few days. This makes a fully wireless, or battery-operated remotely controllable device, impractical.

Motorized hose reels also exist. Such reels have mechanical and electrical controls on the reel itself.

SUMMARY OF THE INVENTION

Accordingly, a need exists for improved control over fluid flow through a hose system, as well as over a motorized reel. A need also exists to reduce the power needed to operate this and other types of remote control systems for supplemental fluid flow controller and/or motorized reels. In satisfaction of these needs, the present application provides various embodiments that permit remote control of supplemental flow controllers and motorized reels for hose systems.

In one aspect, the present invention provides a hose control system comprising a flow controller, a hose reel device, electronic components, and a remote control. The flow controller includes an inlet, an outlet, a fluid flow path defined between the inlet and outlet, and an electrically actuated valve positioned to selectively close the fluid flow path. The hose reel device, which is in fluid communication with the outlet of the flow controller, comprises a rotatable drum onto which a hose can be spooled, and an electrical motor connected to rotate the drum. The electronic components are in communication with, and are configured to convey electrical power to drive, the valve and the motor. The electronic components comprise a wireless receiver configured to receive wireless command signals for controlling the valve and the motor. The remote control comprises manual controls and a wireless transmitter. The wireless transmitter is configured to transmit command signals to the wireless receiver for controlling the valve and the motor. The manual controls are connected to the wireless transmitter to permit control of the wireless transmitter.

In another aspect, the present invention provides a hose control system comprising a flow controller, a rotatable hose reel drum onto which a hose can be spooled, an electrically controllable motor connected to rotate the drum, electronic components, and a remote control. The flow controller has an inlet, an outlet, a fluid flow path defined between the inlet and outlet, and an electrically actuated valve positioned to selectively close the fluid flow path. The electronic components are in communication with the valve and the motor. The remote control is configured to transmit wireless command signals to the electronic components for controlling the valve and the motor.

In another aspect, the present invention provides a hose control system comprising a flow controller, a rotatable hose reel drum onto which a hose can be spooled, a motor connected to rotate the drum, a receiver, and a remote control. The flow controller has an inlet, an outlet, a fluid flow path defined between the inlet and outlet, and a valve positioned to selectively close the fluid flow path. The inlet is configured to mate with a residential water faucet, and the outlet is configured to mate with a water hose. The receiver is configured to receive wireless command signals for controlling the valve and the motor. The remote control is configured to transmit wireless command signals to the receiver for controlling the valve and the motor.

In another aspect, the present invention provides a power savings system comprising a wireless receiver and a power control unit. The wireless receiver is configured to receive wireless signals for controlling at least one of an electrical motor driving rotation of a hose reel and an electrically actuated valve controlling a fluid flow through a hose system. The wireless receiver is capable of receiving the wireless signals only when the wireless receiver is in a powered state. The power control unit is configured to repeatedly switch the wireless receiver between powered and unpowered states in a cycle. In one embodiment, the power control unit is configured to keep the wireless receiver in its unpowered state for no more than a set time period during each cycle. In this embodiment, the system further comprises a remote control configured to transmit wireless command signals for controlling at least one of the motor and the valve, the remote control configured so that each signal is transmitted for a duration at least as long as the set time period.

In another aspect, the present invention provides a power savings system comprising a wireless receiver and a power control unit. The wireless receiver is configured to receive wireless signals for controlling at least one of an electrical motor driving rotation of a hose reel and an electrically actuated valve controlling a fluid flow through a hose system. The wireless receiver is capable of receiving the wireless signals only when the wireless receiver is in a powered state. The power control unit is configured to reduce power consumption by applying an initial voltage to initiate movement of a mechanical device and then reducing the voltage to the mechanical device after the mechanical device begins moving and before the mechanical device is intended to stop. In one embodiment the mechanical device is the valve. In another embodiment the mechanical device is the motor.

In another aspect, the present invention provides the following method: A wireless valve command signal is received for controlling an electrically actuated valve, the valve positioned to selectively close a fluid flow path through a hose system. The valve is positioned in response to the wireless valve command signal. A wireless reel command signal is received for controlling an electrical motor connected to rotate a drum onto which hose can be spooled. The motor is activated in response to the wireless reel command signal.

In another aspect, the present invention provides the following method: A wireless valve command signal is transmitted from a remote control to a wireless receiver. Fluid flow through a hose system is controlled in accordance with the wireless valve command signal. A wireless reel command signal is transmitted from the remote control to the wireless receiver. An electric motor is controlled in accordance with the wireless reel command signal, the motor connected to rotate a rotatable reel drum onto which hose can be spooled.

In another aspect, the present invention provides a method of conserving power in the detection of a wireless signal from a remote transmitter. According to the method, a wireless receiver is repeatedly switched between powered and unpowered states in a cycle. The wireless receiver is configured to receive wireless signals for controlling at least one of an electrical motor driving rotation of a hose reel and an electrically actuated valve controlling a fluid flow through a hose system. The wireless receiver is capable of receiving the wireless signals only when the wireless receiver is in its powered state. If the wireless receiver receives a wireless signal while in its powered state, switching the wireless receiver to its unpowered state is ceased.

In another aspect, the present invention provides a power saving valve controller comprising a flow controller and electronic components in communication with the flow controller. The flow controller comprises an inlet, an outlet, a fluid flow path defined between the inlet and outlet, and an electrically actuated valve positioned to selectively close the fluid flow path. The electronic components comprise a wireless receiver configured to receive wireless command signals for controlling the valve, and a power control unit configured to repeatedly switch the wireless receiver between powered and unpowered states in a cycle.

In another aspect, the present invention provides a power saving valve controller comprising a flow controller and electronic components in communication with the flow controller. The flow controller comprises an inlet, an outlet, a fluid flow path defined between the inlet and outlet, and an electrically actuated valve positioned to selectively close the fluid flow path. The electronic components comprise a wireless receiver and a power control unit. The receiver is configured to receive wireless command signals for controlling the valve. The power control unit is configured to reduce power consumption by applying an initial voltage to initiate movement of the valve and reducing the voltage to the valve after the valve begins moving but before movement of the valve is intended to stop.

In another aspect, the present invention provides a method of reducing the power consumed by a flow controller. According to the method, a receiver is repeatedly switched on and off, the receiver being configured to receive wireless command signals for controlling an electrically actuated valve of the flow controller. If the receiver receives a wireless command signal, the receiver is kept on to allow the receiver to transmit the command signal to the electrically actuated valve.

In another aspect, the present invention provides a method of reducing the power consumed by a flow controller. According to the method, an electronic logic unit is kept in an unpowered state until a detection unit detects a wireless signal, the electronic logic unit being configured to receive the signal from the detection unit and process the signal to control a valve in the flow controller. The electronic logic unit is powered when the detection unit detects a wireless signal.

In yet another aspect, the present invention provides a method of reducing the power consumption of a system for controlling at least one of fluid flow in a hose system and a motor driving rotation of a reel drum for spooling a hose of the hose system. According to the method, an initial voltage is applied to initiate movement of a mechanical device. The initial voltage is reduced after the mechanical device begins moving but before the mechanical device is instructed to stop moving.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 1A is a schematic illustration of a remotely controlled valve in accordance with a preferred embodiment.

FIG. 1B is a schematic cross-section of a flow controller constructed in accordance with a preferred embodiment.

FIG. 2 is a schematic illustration of a remotely controlled valve positioned between two lengths of hose in accordance with another embodiment.

FIG. 3A schematically illustrates a remote control in accordance with one embodiment.

FIG. 3B schematically illustrates a remote control in accordance with another embodiment.

DETAILED DESCRIPTION OF THE PREFERRED EMBODIMENT

Figure 4:
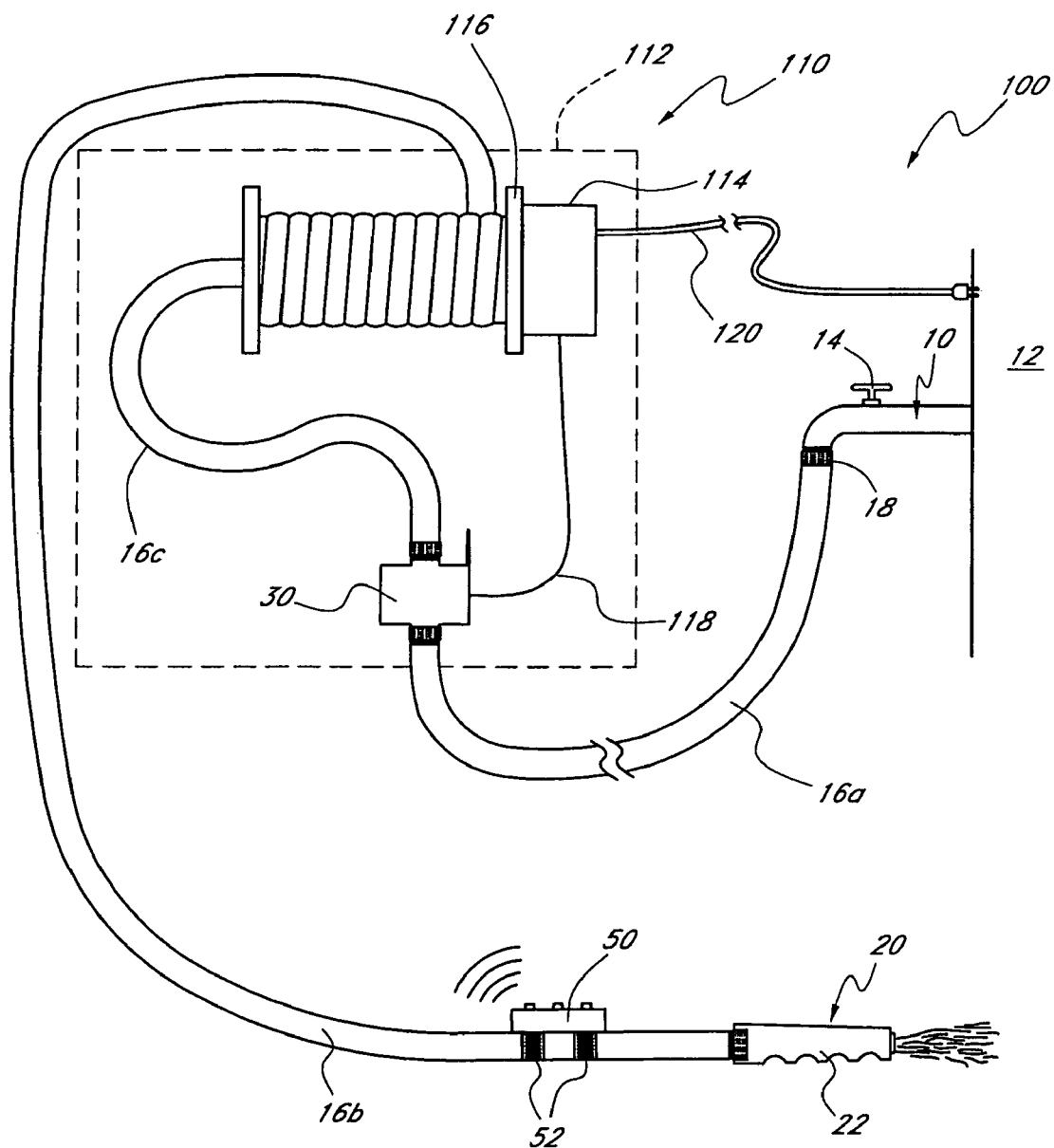
FIG. 4 schematically illustrates a system for remotely controlling fluid flow and reel operation in accordance with another embodiment.

While illustrated in the context of garden hoses for household watering or washing applications, the skilled artisan will readily appreciate that the principles and advantages of the preferred embodiments are applicable to other types of hose products. For example, in addition to the illustrated liquid application, the fluid flow through the hose can comprise compressed air or vacuum suction for other applications.

FIG. 1A illustrates one embodiment of the present invention. A fluid source is illustrated in the form of a water faucet 10 extending from the wall of a building 12. The faucet 10 includes a valve or spigot with a manual control 14. A hose line 16 in communication with the faucet 10 extends from a proximal end 18 to a distal end 20, terminating in a nozzle 22. The nozzle 22 is conventionally configured to receive attachments. Preferably, the nozzle receives a manually actuated nozzle attachment (not shown), such as a spray gun.

A flow controller 30 is positioned at some point between the distal end 20 of the hose line 16 and the water faucet 10. The flow controller 30, shown in more detail in FIG. 1B, defines a fluid flow path 32 from an inlet 34 to an outlet 36. Desirably, the inlet 34 is configured with internal threading to receive the external threads of a conventional faucet outlet. Similarly, the flow controller outlet 36 defines external threads of a standard diameter and pitch to receive the internal threads of a conventional garden hose connection. Along the flow path 32 an electrically actuated valve 38, such as a solenoid valve, for example, selectively permits or inhibits flow therethrough. Such electrically actuated valves with inlets and outlets are known in commercially available sprinkler timing systems. If the term "supplemental" is used to describe the flow controller 30, the flow controller may still be the only controller in the system. In other words, the term "supplemental" is not necessarily meant to suggest that there must be other means of controlling the flow; rather, the term is used as an aid to distinguish this flow controller over other items, such as the manual control 14.

In the illustrated embodiments (FIGS. 1A, 1B, 2, 4, and 5), the flow controller 30 includes electronics 40 configured to receive and communicate signals, or command signals, from a remote source such as a transmitter or remote control 50 (FIGS. 1A, 2, 3A, 3B, 4 and 5). Thus, the electronics 40 aided by an antenna 42, include a wireless receiver configured to receive electromagnetic signals from a remote source, and to translate those signals into signals that may open or close the electrically actuated valve 38. Additionally, as shown in FIG. 4, the flow controller 30 may be linked, via one or more wires 118, to a motor 114 that drives rotation of a reel drum 116. Thus, the flow controller 30 can send signals to control the operation of the motor 114 for the reel, the motor command signals being conveyed to the motor via the wire connection 118. The wire connection can also convey power to one or both of the flow controller 30 and the motor 114. In the illustrated embodiment, the motor 114 is powered by connection of an electrical plug 120 to a power supply, the wire connection 118 conveying power to the flow controller 30. Examples of communication methods include infrared (IR) and radio frequency (RF) communications.

Figure 5:
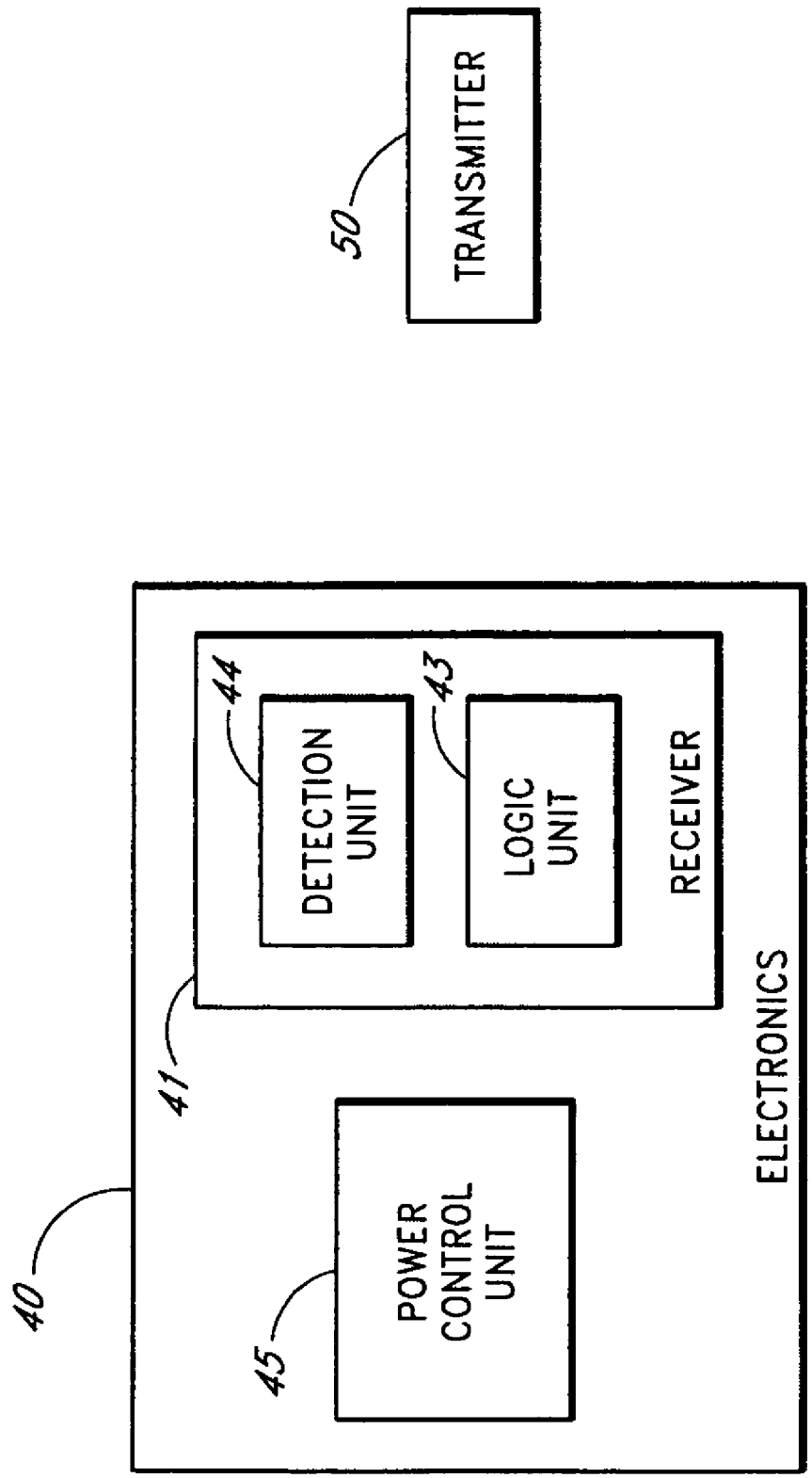
FIG. 5 is a schematic representation of the electronics of one embodiment.

As illustrated in FIG. 5, the wireless receiver 41 will comprise some type of detection unit 44, such as an RF receiver integrated circuit (IC) chip, configured to detect incoming wireless signals. Additionally, the receiver 41 may comprise a logic unit or circuit 43, which is configured to analyze and decode incoming wireless signals detected by the detection unit 44 and determine what, if any, response should be generated. The receiver 41 is preferably configured to communicate, electrically, with an electrically driven device, in order that the electrical signals can be converted into a physical change, such as the actuation of a valve, for example. The detection unit 44 and the logic unit 43 need not be physically located within a single housing or receiver 41.

Note that, while illustrated as an external component, antenna 42 the antenna can alternatively be incorporated within the housing of the flow controller 30. Also illustrated in FIG. 1B is a self-contained DC power source in the form of batteries 47. It will be understood that the flow controller 30 can alternatively be powered by AC current from an electrical outlet on the building 12, or by solar cells or the like.

In another embodiment, the logic unit will be external to the receiver. This logic unit could be an Application-Specific Integrated Circuit (ASIC), or a standard IC decoder unit. The logic unit can preferably be powered down when it is not needed.

Additionally, as shown in FIG. 5, the electronics 40 may include a "power control unit" that lowers the power consumption of the receiver 41. The power control unit 45 may be especially valuable when the receiver 41 is powered by batteries 47. As explained above in the Background section, a conventional wireless receiver consumes a great deal of power because the receiver must continually monitor for wireless commands. If the receiver is powered by batteries, the battery power would be exhausted in a very short period of time, such as a week or less The power control unit 45 overcomes this limitation. In one embodiment, of the power control unit 45, the receiver 41 may function for up to six months.

In one embodiment, the power control unit may allow a receiver to function for up to twenty times longer than a receiver without the power control unit.

In one embodiment, the power control unit 45 generally operates by shutting down the detection unit 44 of the receiver 41, and all other electronics for a "reasonable response time." A "reasonable response time" means a time period that a user would not notice or mind in the operation of the remote control transmitter 50. In another embodiment, a "reasonable response time" is defined as slightly shorter than the duration that the signal from the remote control transmitter lasts 50. For example, when activation of the transmitter 50 results in a signal that lasts 3 seconds, then the shut down time on the detection unit 44 is preferably less than 3 seconds. In alternative embodiments, the shut down time of the detection unit 44 is longer than the duration of the signal from the transmitter 50 In these embodiments, the transmitted signal may not be detected by the detection unit 44, which could cause more substantial wait times. In an alternative embodiment, the reasonable response time factors in the fact that some of the embodiments are as a water hose operated device, for which a user may be willing to wait several seconds before anything occurs at the user's location. In an alternative embodiment, a reasonable response time is a time period determined by the necessary life of the battery and the power currently in the battery. For example, if the battery, or batteries, should last for a years worth of continuous use in the receiver 41, but the batteries only supply 1 week's worth of continuous activity for the detector unit 44, then the power control unit 45 will only activate the detector unit approximately 1 second out of every 52 seconds. A 51 second down cycle could result in a very long delay between the initiation of the signal from the transmitter 50 to any flow of water through the hose 16, but this is merely an example of how the time periods could be set. However, the detector unit 44 needs only a fraction of a second to determine if a signal is being received. For example, the detector unit 44 could be on for 1/50 of a second, or 20 milliseconds, during each second. This would be a sufficient time to recognize if a signal is being received and would save a significant amount of power.

Once the power control unit 45 powers up the detection unit 44, the detection unit searches for a signal. This process of repeatedly shutting on and off the detection unit 44, as well as other current draining equipment, limits the amount of power needed for continuously monitoring for incoming wireless signals. If the detection unit 44 does not detect a signal within a set amount of time, the power control unit 45 preferably turns off the power to the detection unit for another period of time, thus repeating a cycle.

In another embodiment, the power control 45 unit also turns off the logic unit 43. The logic unit 43 need not be automatically turned back on after a certain period of time. Instead, powering on the logic unit 43 on is only required when a wireless signal is detected by the detection unit 44. In one embodiment, this signal is a valid command from the remote transmitter 50 to open or close the valve 38 or activate the motor 114.

In either of these power saving embodiments, the device can be configured to return to its power saving mode after a wireless signal has been detected and the signal ceases. That is, while the detection of a signal results in the power control unit 45 allowing the device to use more power, the end of a signal may also allow the power control unit to return the electronics 40 to their low power consumption state. In some embodiments it may be desirable to include a delay following the cessation of the signal, in case another signal is likely to follow. For example, it may be efficient to leave the electronics 40 fully operational, even after a signal to close the valve 38 has stopped being transmitted, as it may be likely that a signal to rewind the hose reel is soon to follow.

In one aspect, the power control unit 45 employs an op-amp to switch the detection unit 44 on and off, repeatedly, in order to conserve battery life.

Figure 6:
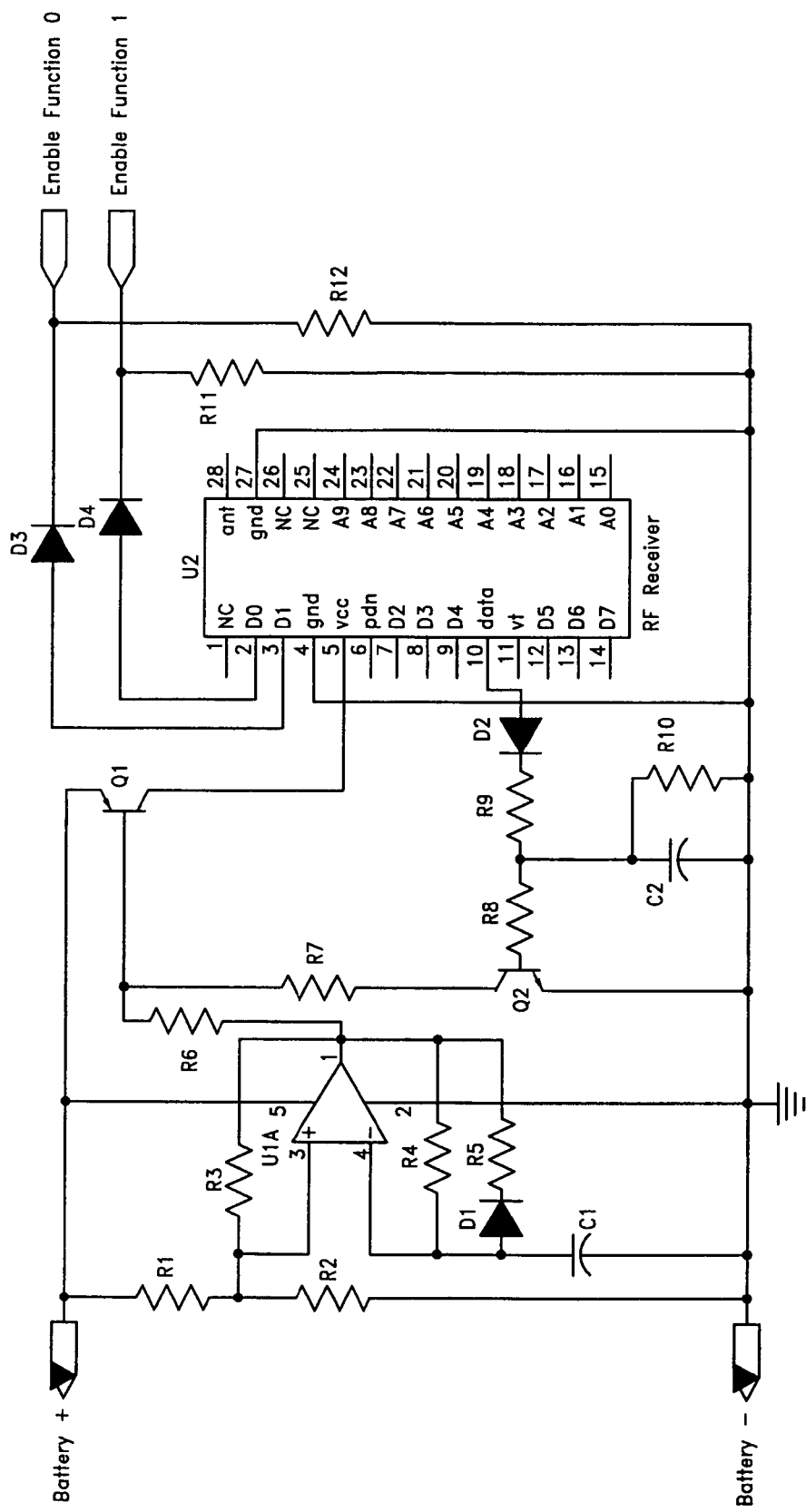
FIG. 6 is an embodiment of a power control unit.
Figure 7A:
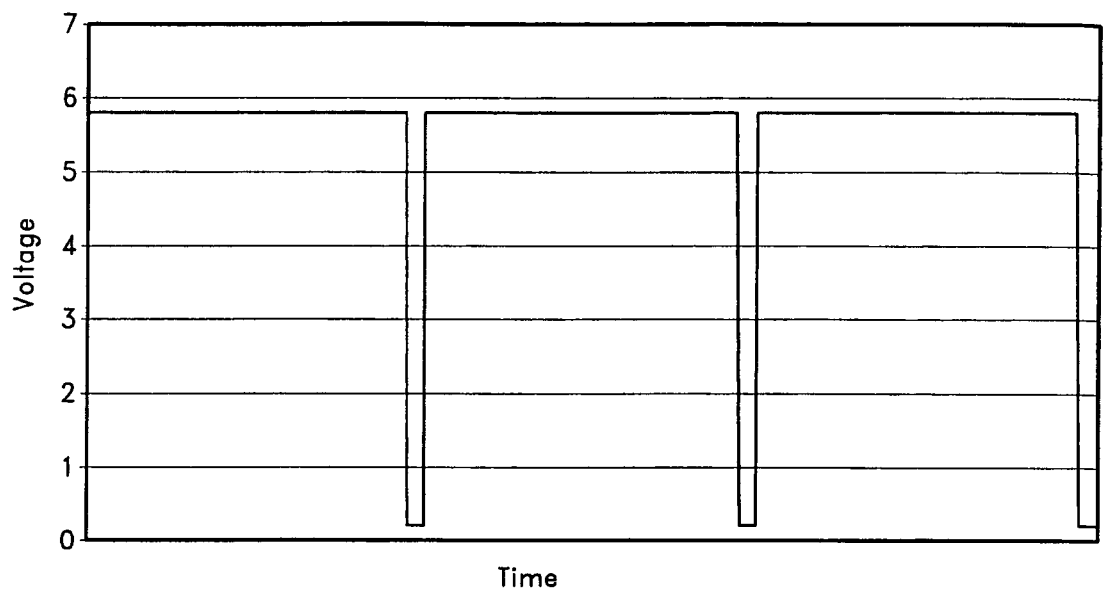
FIG. 7A is a graph of the voltage at the output pin 1 of the op-amp of FIG. 6.
Figure 7B:
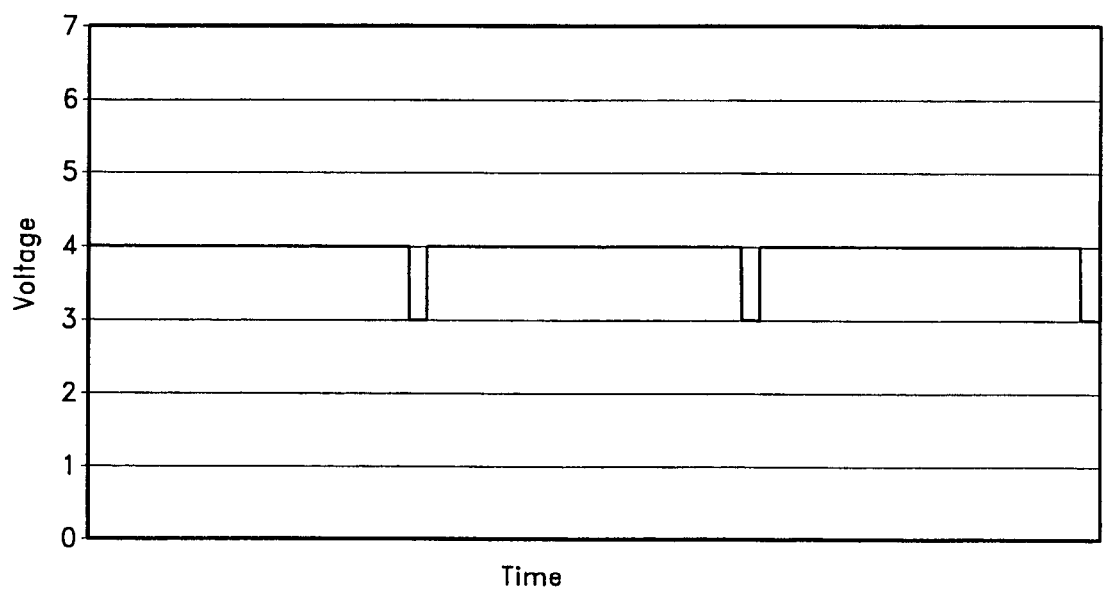
FIG. 7B is the voltage at the non-inverting input pin 3 of FIG. 6.
Figure 7C:
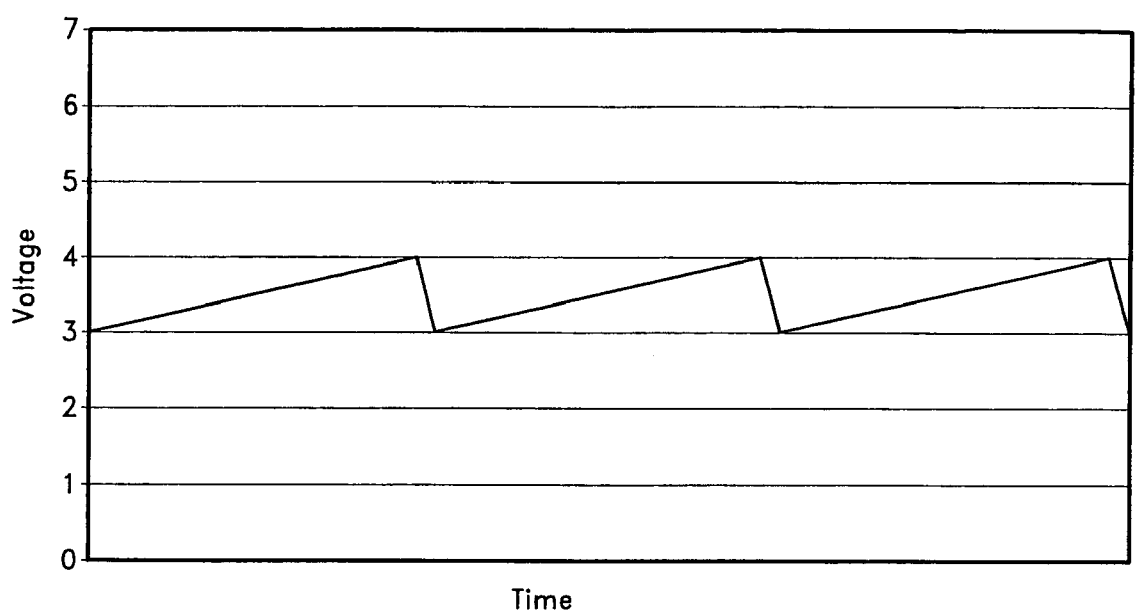
FIG. 7C is the voltage at the inverting input pin 4 of FIG. 6.

A preferred embodiment of a power control unit can be seen in FIG. 6. The power control unit preferably comprises a very low power bi-stable oscillator. The oscillator comprises an op-amp U1A, a plurality of resistors R1, R2, R3, R4 and R5, a capacitor C1, and a diode D1. The op-amp U1A has a non-inverting input pin 3, an inverting input pin 4, and an output pin 1, among others. Resistors R1, R2, and R3 form a voltage divider, which provides one of two voltages to the non-inverting input pin 3 of the op-amp U1A. The resistor R3 provides hysteresis to stabilize the op-amp. While the receiver is an RF receiver in this embodiment, other communications methods could also be used in place of RF communications. FIGS. 7A, 7B, and 7C illustrate the voltages at the pins of the op-amp. FIG. 7A is the voltage at the output pin 1 of the op-amp. FIG. 7B is the voltage at the non-inverting input pin 3, and FIG. 7C is the voltage at the inverting input pin 4.

The voltage at non-inverting pin 3 is higher when the voltage at the output pin 1 is high because of the effects of the voltage divider. The capacitor C1 charges, gradually increasing the voltage at the inverting pin 4 until the voltage equals the voltage of the non-inverting pin 3. The op-amp U1A then changes the output of pin 1 to its low voltage, $V_{ol}$. Because there are no capacitors connected to the non-inverting pin 3, and thus no time delay, the low output on pin 1 immediately reduces the voltage to pin 3. The low output voltage also causes current to flow though the resistors R4 and R5 and lowers the voltage across the capacitor C1. Voltage across a capacitor cannot change immediately, so the voltage at the inverting input 4 gradually decreases. When the voltage at pin 4 decreases to the voltage of the non-inverting pin 3 the output pin 1 of the op-amp U1A rises to the op-amp's high voltage, $V_{oh}$. The high output of the output pin 1 causes current to flow though the resistor R4 and raises the voltage across the capacitor C1. As the capacitor charges, the voltage at the inverting input pin 4 increases. When the voltage at the inverting pin 4 equals the voltage of the non-inverting pin 3, the output pin 1 switches to $V_{ol}$, thus repeating a continuous cycle. The non-inverting duration ($T_p$) is proportional to the time constant determined by the resistance of resistor R4 multiplied by the capacitance of capacitor C1. The inverting duration ($T_n$) is proportional to the time constant of the combined resistance of resistors R3 and R4 in parallel multiplied by the capacitance of capacitor C1. This time constant is defined as $((R4*R3)/(R4+R3))*C1$.

When the output pin 1 of op-amp U1A is high, a transistor Q1 has no base current and does not conduct. This turns the power off to the RF receiver U2. When the output pin 1 of the op-amp U1A is low, the transistor Q1 has base current conducting through the resistor R6 and turns on such that the voltage at the collector of the transistor Q1 is close to the voltage of Battery+. This turns the power on to the RF receiver U2. As described above, $T_n$, the time that the RF receiver U2 receives power, is proportional to the time constant. In a preferred embodiment, $T_n$ is 1/20 of the total cycle time, $T_n+T_p$. Preferably, the RF receiver is on between about 2% and 20% of each cycle, more preferably between about 3% and 10%. The on and off duration can be further modified by making the resistors R1 and R2 unequal to form an additional voltage divider.

The RF receiver U2 outputs a signal on the data pin 10 if there is a RF command being received. When the output of data pin 10 is high, current conducts through a diode D2, charging the capacitor C2. When the voltage across the capacitor C2 is above 0.6 volts, current conducts through a resistor R8 and the base-emitter junction of a transistor Q2. When current conducts through the base-emitter junction of the transistor Q2, the transistor Q2 turns on and the voltage at the collector is close to ground. This causes current to flow through a resistor R7 and the transistor Q1 base-emitter junction thus holding the transistor Q1 in the on state, applying power to the RF receiver U2. This performs the function of applying power to the RF receiver U2 while the command is decoded and executed. In this embodiment, the RF receiver U2 receives the RF data and also decodes it. When the RF reciver no longer is receiving a signal, the data pin 10 goes low and the control of power to the RF receiver U2 is restored to the bi-stable oscillator.

When the RF receiver U2 has decoded a command it outputs the results on data pin D0, pin 2 of RF receiver U2, and/or data pin D1, pin 3 of the RF receiver U2. If the function1 port is to be enabled, then the RF receiver U2 outputs a high voltage on the data pin D0 (pin 2). If the function0 port is to be enabled it outputs a high voltage on the data pin D1 (pin 3). A high voltage on the data pin D0 (pin 2) will cause current to flow through the diode D4 and pull the enable function1 port to a high voltage. A high voltage on the data pin D1 (pin 3) will cause current to flow through the diode D3 and pull the enable function0 port to a high voltage. In another embodiment of a power control unit seen in FIG. 8, the power control unit preferably comprises an op-amp U1A, a plurality of resistors R1, R2, R3, R4 and R5, and a capacitor C1 to form a very low power bi-stable oscillator similar to the embodiment above.

Figure 8:
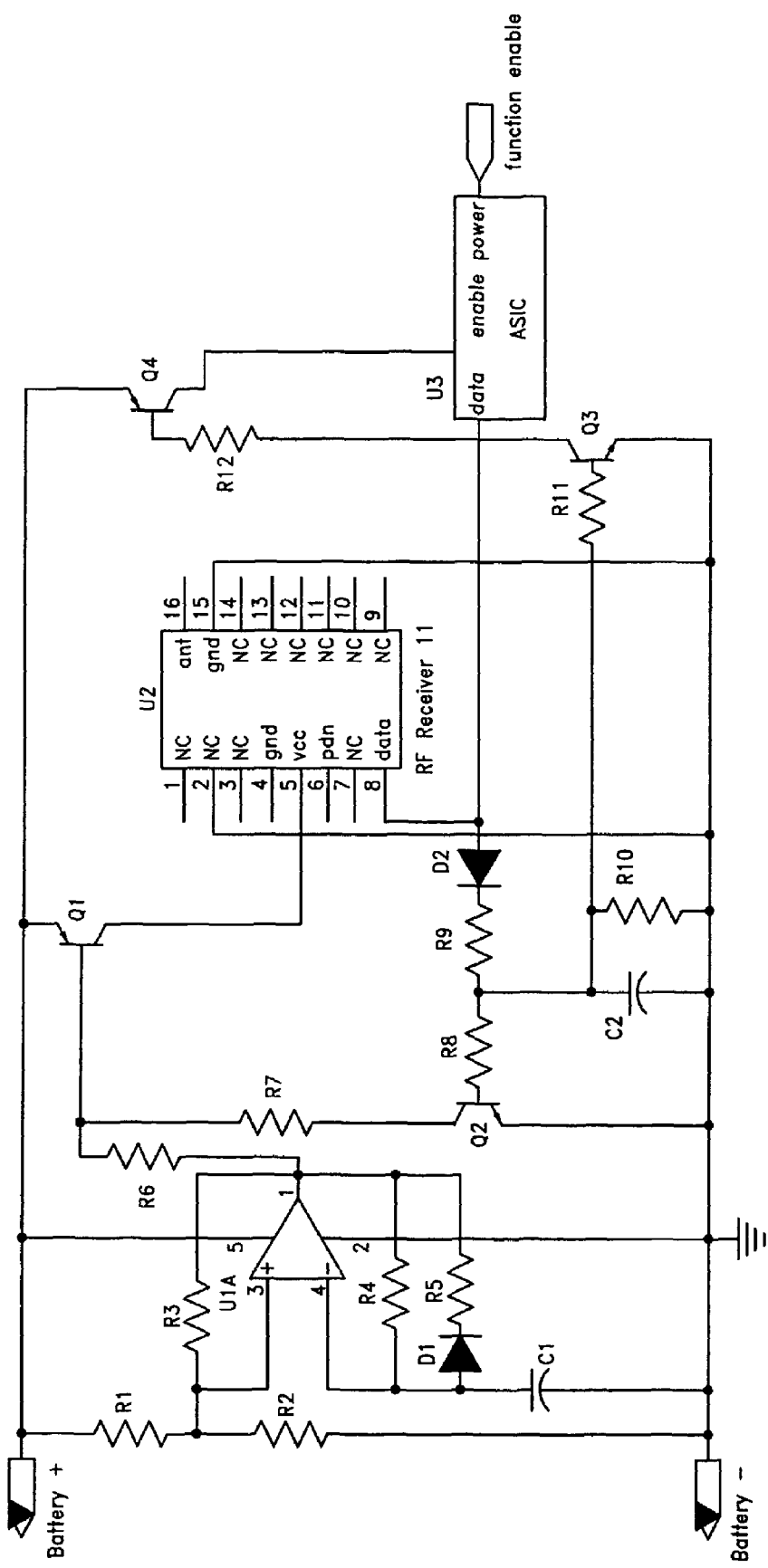
FIG. 8 is another embodiment of a power control unit.

When the output pin 1 of the op-amp U1A is high, a transistor Q1 has no base current and does not conduct. This turns the power off to a RF receiver U2. In this embodiment, the RF receiver U2 serves only as a receiver. The RF receiver U2 passes the data to an ASIC U3 for decoding as seen in FIG. 8. When the output pin 1 of the op-amp U1 is low, the transistor Q1 has base current conducting through the resistor R6 and turns on such that the voltage at the collector is close to Battery+. The high collector voltage turns the power on to the RF receiver U2.

The output of the RF receiver U2 on data pin 8 is used to maintain power to the RF receiver U2 while the command is being received. The RF receiver U2 outputs a signal on data pin 8 if there is an RF command being received. When the output on the data pin 8 is high, current conducts through the diode D2, charging the capacitor C2. When the voltage across the capacitor C2 is above 0.6 volts, current conducts through a resistor R8 and the base-emitter junction of a transistor Q2. The transistor Q2 turns on and the voltage at the collector is close to ground. This causes current to flow through a resistor R7 and the transistor Q1 base-emitter junction. Thus, the transistor Q1 is held in the on state, applying power to the RF receiver U2 while the command is decoded.

The output of the RF receiver U2 on data pin 8 is also used to maintain power to the ASIC U3 while the command is being decoded. When the voltage across the capacitor C2 is above 0.6 volts, current conducts through a resistor R11 and the base-emitter junction of a transistor Q3. The transistor Q3 turns on and the voltage at the collector is close to ground. This causes current to flow through a resistor R12 and the transistor Q3 base-emitter junction thus holding a transistor Q4 in the on state, applying power to the ASIC U3. When the ASIC U3 has decoded a command it and determines that the command is a valid command, it outputs a high voltage on the function enable port which turns the power on to the electronics to implement the appropriate functions. The data pin 8 of the RF receiver U2 is turned off, and the power cycle is restored to the control of the bi-stable oscillator.

Figure 9:
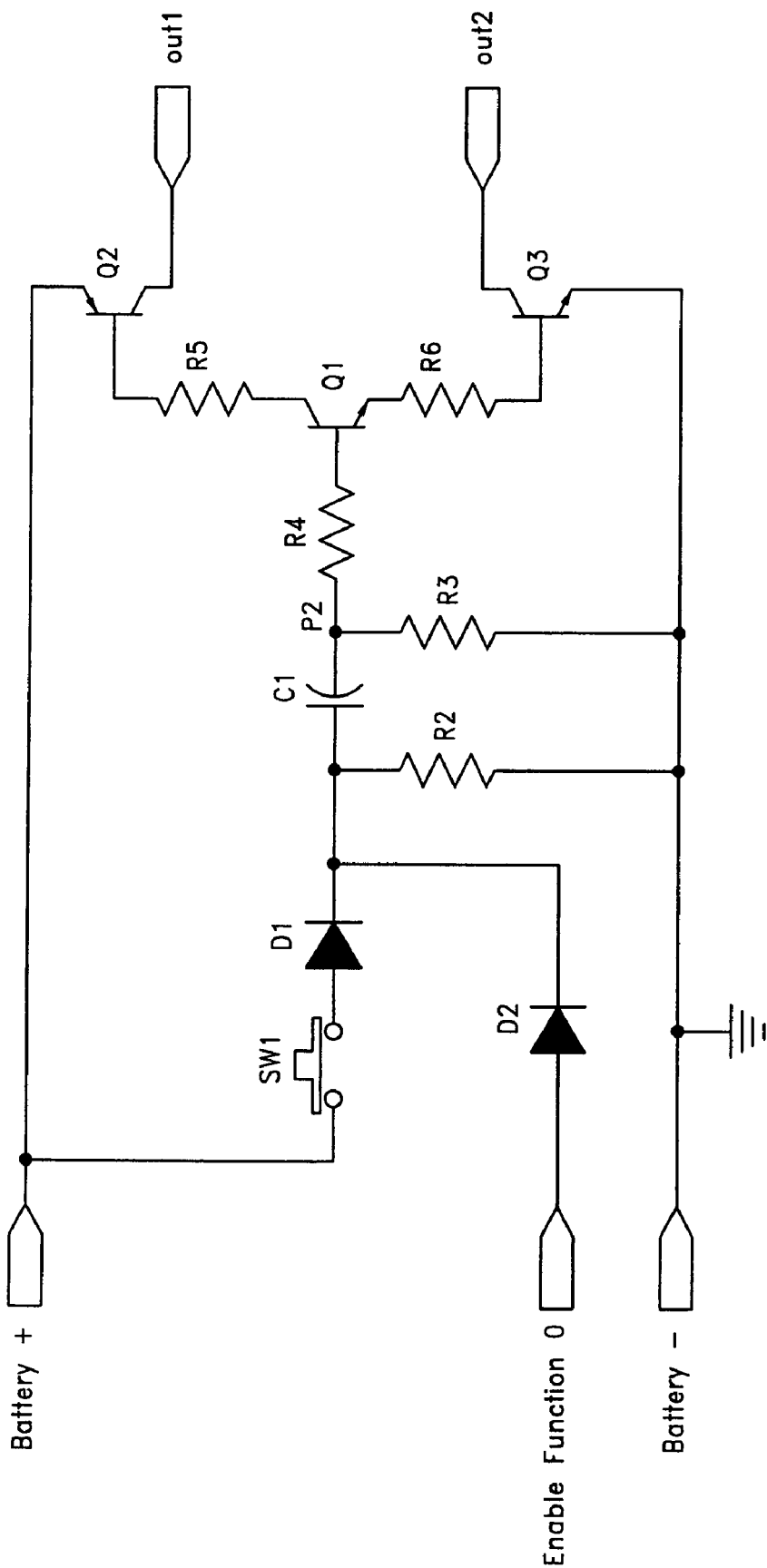
FIG. 9 is another embodiment of a power control unit.

In another embodiment illustrated in FIG. 9, the power control unit alters the voltage that is being applied across a valve operating device for the period of time required to open or close the valve. In one embodiment, the power control unit applies a constant voltage across the valve for a period of time sufficient to overcome the initial friction of the valve in order to start the valve moving. Then, the power control valve decreases the voltage for the next period of time while the valve is moving. This process lowers the total amount of energy needed to open or close the valve. When the user presses the switch S1, the anode of a diode D1 is connected to Battery+. The diode D1 will go into conduction and the voltage at the cathode of diode D1 will rise to the "breakover" voltage of the diode (e.g., 0.6 volts). Similarly, when the voltage at enable function 0 goes high, a diode D2 will go into conduction and the voltage at the cathode of the diode D2 will rise to 0.6 volts. When voltage at the cathode of either diode D1 or D2 is high, the voltage across a capacitor C1 changes. The voltage across the capacitor C1 cannot change instantaneously, so current flows through a resistor R4 and the emitter-base junction of a transistor Q1. The transistor Q1 turns on and saturates the collector-emitter junction voltage. Current flows through a resistor R5 and the emitter-base junction of a transistor Q2. Additionally, current flows through a resistor R6 and the emitter-base junction of a transistor Q3. This current is initially enough to saturate Q2 and Q3, thus effectively connecting Out1 and Out 2 to Battery+ and Battery– respectively.

As the capacitor C1 charges, the voltage across the resistor R4 decreases. When the transistor Q1 is no longer saturated, the current through the resistors R5 and R6 will fall, which will cause the transistors Q2 and Q3 to no longer be saturated. The voltage at out1 will slowly drop from Battery+ and the voltage at out2 will slowly increase from battery–. This effectively decreases the voltage between out1 and out2, which is the voltage across the water valve. As the voltage across the valve decreases, the power which is consumed by the valve decreases. When the transistors Q1, Q3, and Q4 are turned off, the power is disconnected from the valve.

Figure 10A:
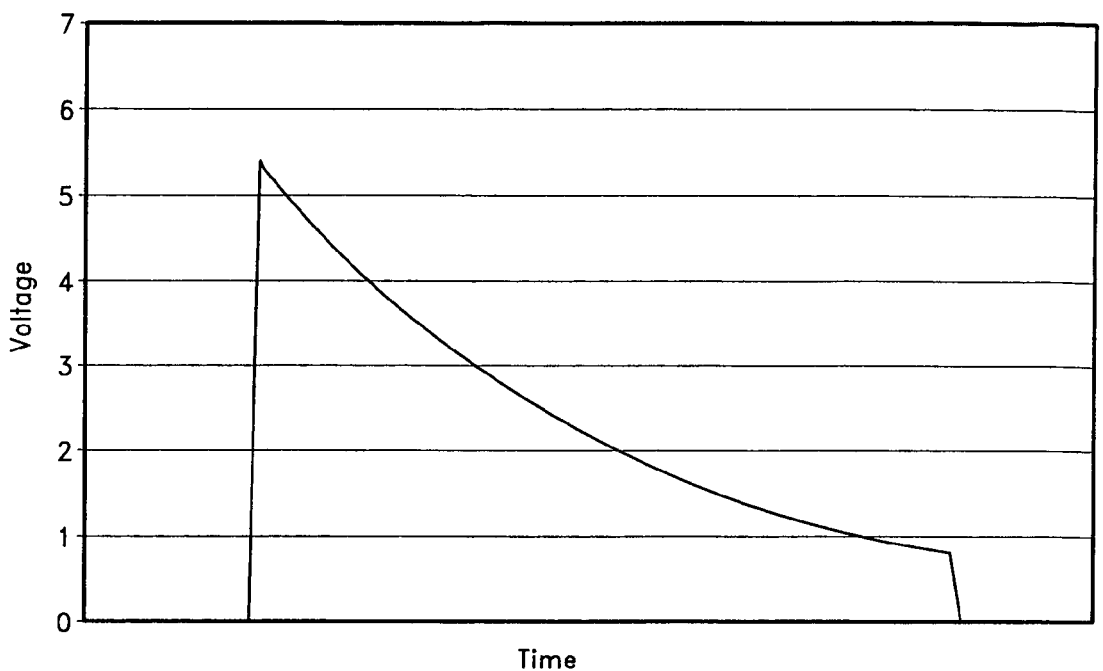
FIG. 10A is a graph that illustrates the voltage for point p2 of FIG. 9.
Figure 10B:
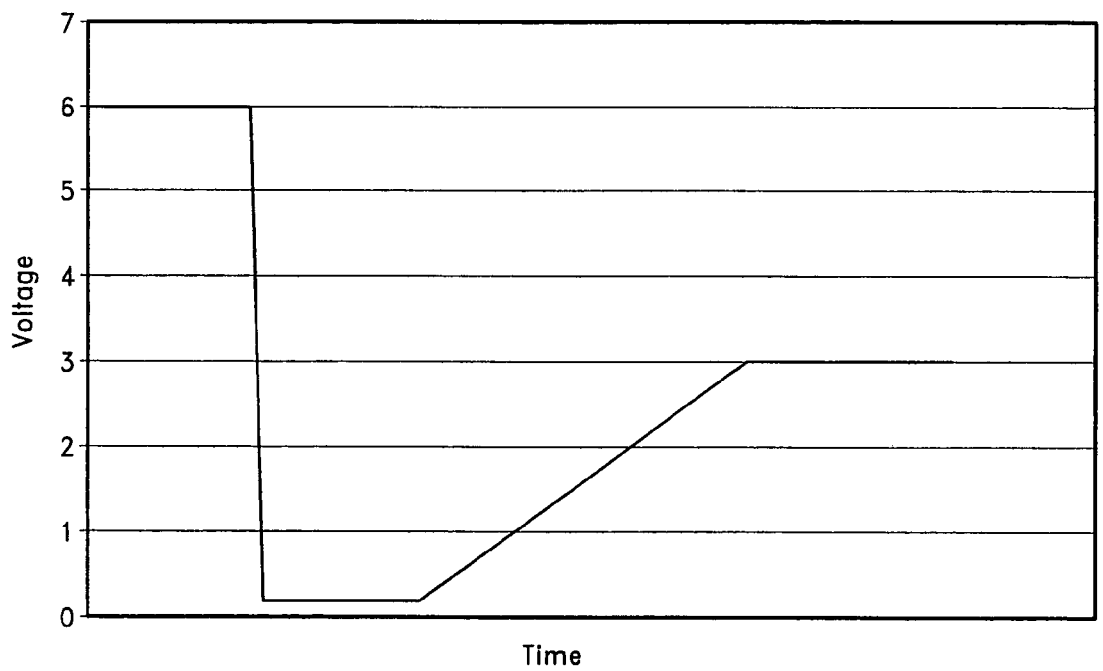
FIG. 10B is a graph of the voltage at out1 of FIG. 9.
Figure 10C:
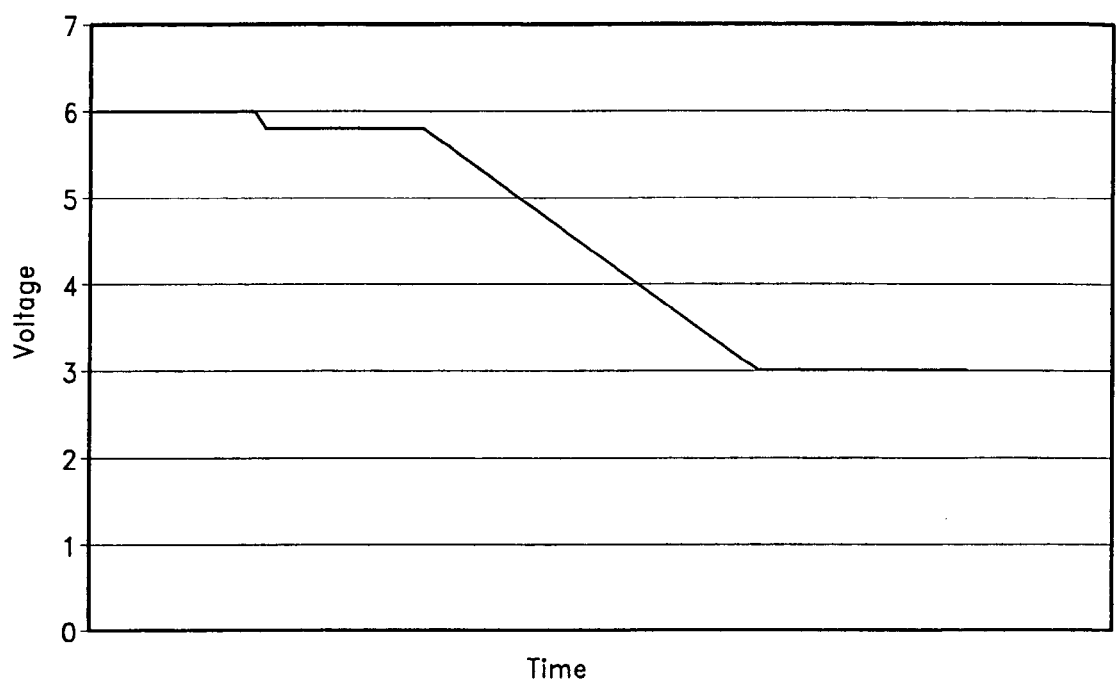
FIG. 10C is a graph of the voltage at out2 of FIG. 9.
Figure 10D:
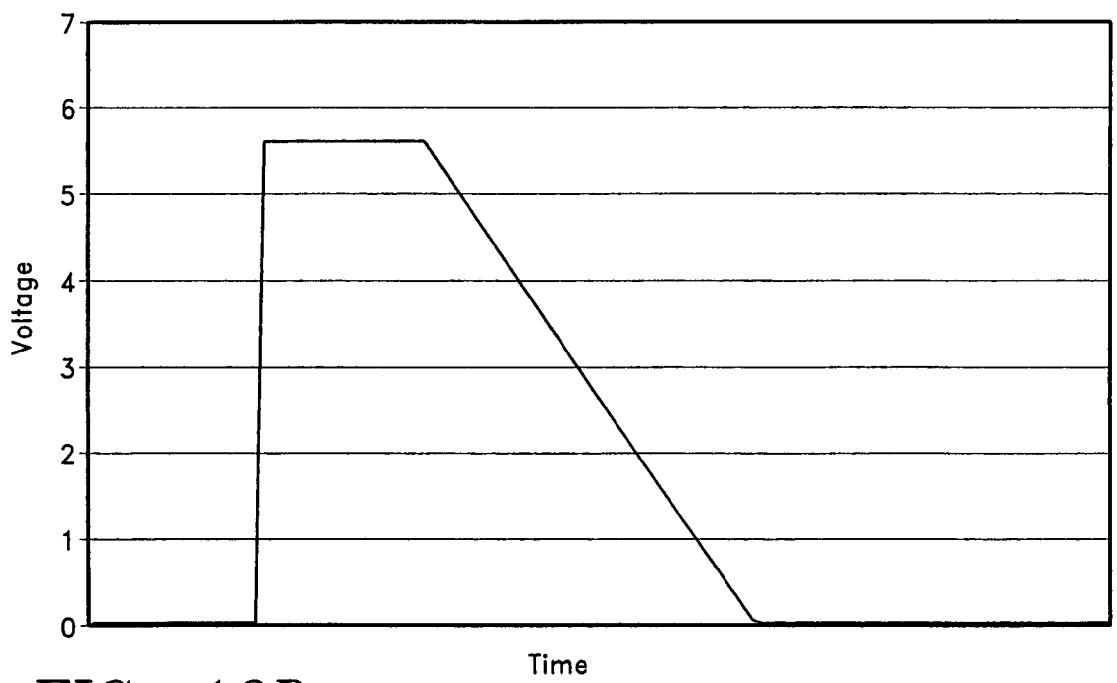
FIG. 10D is a graph showing that the voltage across the ports out1 and out2 of FIG. 9 go to zero when the voltage at point p2 decreases below 1.4 volts

FIGS. 10A, 10B, 10C and 10D illustrate the process of slowly turning down the voltage across the water valve. The numbers in these graphs are merely suggestive of actual numbers, and will vary depending on component values. In FIG. 10A, the graph illustrates the voltage for point p2, which is at the node of the resistors R3 and R4 and the capacitor C1. FIG. 10B is a graph of the voltage at out1. FIG. 10C is a graph of the voltage at out2. Note that when the voltage at P2 decreases below 1.4 volts, there is insufficient voltage to turn on the transistors Q2 and Q3, and the voltage to the ports out1 and out2 is equal. As illustrated in FIG. 10D, the voltage across the ports out1 and out2 goes to zero when the voltage at point p2 decreases below 1.4 volts. The voltage alteration process applies full voltage across the valve to break the friction and start the valve moving and then decreases the voltage during the period that the valve is moving to minimize the power consumption.

Similar circuits can be used throughout the device to further limit the power consumption for other functions. In a preferred embodiment, there is a circuit for each function enable setting.

In one embodiment, several of the above power consumption units are used together. Any combination may be used, and a combination of all three power consumption units is contemplated. In one embodiment, the voltage shaping circuit is used with either of the power control units. While the power control units have been described in relation to their operation to a flow controller for a hose, and in particular for controlling a valve, one of skill in the art will recognize that these power control units can be useful in any situation where the minimization of power consumption is desirable. This is true regardless of whether or not the receiver unit is powered by batteries or involves a flow controller.

Referring again to FIG. 1A, the apparatus further comprises a remote control 50, which is capable of communicating wirelessly with the electronics 40 of the flow controller 30, as described above. Accordingly, the remote control 50 includes a wireless transmitter and power source (preferably a battery 47). In one embodiment, the system operates on radio frequency. In one preferred embodiment, frequencies in the range of 433 MHz to 900 MHz are used. However, in other embodiments, infrared or other ranges of electromagnetic radiation can be employed. Preferably, the transmitter operates off of a DC current with a preferred minimum range of 100 feet, more preferably with a minimum range of 200 feet. In the illustrated embodiment, the remote controller 50 is mounted on the hose 16, particularly proximate the nozzle 22. The remote controller 50 can be mounted on the hose 16 by any suitable manner, including standard attachment bands 52 as illustrated.

Referring now to FIG. 2, the system for controlling flow is illustrated in accordance with another embodiment. In this embodiment, the flow controller 30 is again placed between the faucet 10 and the nozzle 22 that terminates the distal end 20. However, rather than placing the flow controller 30 directly at the proximal end 18 of the hose line, the flow controller 30 is placed in an intermediate position along the hose line. Namely, the flow controller 30 is positioned between a first hose length or section 16a and a second hose length or section 16b. Additionally, the remote control 50 is shown freely held by a user's hand 54, rather than being mounted on the hose. As illustrated, the remote 50 can be very small, such as the remote controls sometimes found on key chains or as part of a key for automobile remote security control.

FIG. 3A illustrates one simple embodiment for the "key chain" remote control 50. In this simple embodiment, the remote control 50 simply toggles the electrically actuated valve 38 (FIG. 1B) between open and closed conditions. The remote control 50 includes manually operated controls for user operation. In the illustrated embodiment, an "ON" button 58 represents the open condition for the electrically actuated valve 38 while an "OFF" button 59 represents the closed condition for this electrically actuated valve 38. It will be understood that, in other arrangements, a single button can serve to both open and close the electrically actuated valve 38, depending upon the current state of the valve when the signal is sent. In a more complicated arrangement, either or both of the ON and OFF buttons can serve to partially open or partially close the valve along a continuum from the completely open state to the completely closed state. A single dial can similarly function to control the rate of flow by controlling the degree to which the electrically actuated valve 38 is open.

With reference now to FIG. 3B, a remote control 50 with more complicated manual controls is illustrated. As will be better understood from FIG. 4 and related text below, this remote control operates both the flow controller 30 as well as a hose reel mechanism for winding and/or unwinding hose onto/from a hose drum. For example, the remote control 50 can operate the motor 114 of the embodiment of FIG. 4 (described below). In this arrangement, a single valve control button 62 is illustrated, such that pressing the button 62 will send a signal to the electronics 40 (FIG. 1B) of the flow controller 30 to toggle the electrically actuated valve 38 between open and closed conditions. It will be understood that the valve control button 62 can be replaced by two buttons, as in FIG. 3A, or can be replaced by any of the alternatives mentioned in the preceding paragraph.

The remote control 50 of FIG. 3B also includes one or more buttons for controlling hose reel operation. In the illustrated embodiment, the remote control 50 includes a "stop" button 64, for halting the operation of the motor on the hose reel device, a "forward" button 66 for unwinding hose from the hose reel, and a "rewind" button 68 for winding hose onto the hose reel drum. Note the use of symbols on these buttons to mimic standard symbols on tape, compact disc, and video playback devices. In other arrangements, it will be understood that the "forward" button 66 can be omitted when the hose reel is arranged for manual unwinding, simply by pulling on the hose. Additionally, in such an arrangement a single button can be provided (in place of stop and rewind buttons) to toggle the hose reel motor between rewinding and off conditions. The associated electronics and the hose reel device can also be configured to conduct a short, timed rewind with a single quick tap upon the button, and to completely rewind the hose when the button is held down for a longer period of time. The skilled artisan will readily appreciate numerous modifications that can be made to the electronics to operate the flow controller and a hose reel device.

With reference now to FIG. 4, a hose control apparatus 100, including a hose reel device 110, the flow controller 30 and the remote control 50, is illustrated. The first length of hose 16a conveys fluid from the fluid source or faucet 10 to the flow controller 30. In the illustrated embodiment, the hose reel device 110 includes the flow controller 30 inside a hose reel housing 112, although in other arrangements the flow controller 30 can be connected outside the hose reel housing 112. As illustrated, the hose reel device 110 also includes a motor 114 for rotating a hose reel drum 116. A second hose section 16b wraps around the drum 116 and terminates at the distal end 20 in a hose nozzle 22 or attachment device, such as a spray gun or extension rod (not shown). As shown, the remote control 50 is attached at the distal end 20 of the hose, just upstream of the nozzle 22, by way of attachment bands 52 or other suitable means.

Preferably, the flow controller 30 is connected, directly or indirectly, upstream of the hose reel drum. Therefore, when the water is shut off at the flow controller 30, the second hose section 16b can be readily wrapped upon the drum 116 without the difficulties associated with water pressure within the second hose section 16b, despite the fact that the water spigot 14 is turned on and there is water pressure within the first hose section 16a. Fluid connection between the flow controller 30 and the second hose section 16b can be direct, but is preferably conducted via a third hose section 16c that leads to an integrated tubing and a further connection on the drum 116 between the integrated tubing and the second hose section 16b. In one embodiment, a single command from the remote control both turns off the flow of water from the flow controller 30 and starts the hose reel device 110 rewinding. One of the benefits of some of the herein described embodiments is that the combination of a remotely operated valve and remotely operated reel allows the benefits of the other device to be more fully exploited. For instance, as described above, the flow controller 30 allows the reel to more efficiently wind in and unwind the hose. Likewise, the advantage of the remote control for the reel allows one to fully enjoy the remote control aspect of the flow controller 30 since without it, if one were going to put the hose back, one would have to return to the original location of the hose.

The flow controller 30 is also connected by way of the illustrated wire connection 118 to the hose reel motor 114, which is in turn connected to a power source, such as a relatively heavy duty rechargeable battery (not shown) or by the illustrated electrical cord 120 leading to an electrical source or outlet of the building 12. Note that the wire connection 118 can carry both electrical signals from the electronics 40 (FIG. 1B), and power from the power source of the hose reel device 110 to the flow controller 30, thereby obviating a separate battery source for the flow controller 30. The wire connection 118 may comprise one or more wires. It will be understood that, by the illustrated wire connection 118, the flow controller 30 decodes and relays signals from the remote control 50 to operate the hose reel, as discussed above with respect to FIG. 3B. It will be understood by one of skill in the art that, in some embodiments, the precise location of the electronics 40 need not be within the body of the flow controller 30. For instance, the electronics 40, including the wireless receiver 41, may be contained anywhere within the hose reel device 110 or within the hose reel housing 112, or even outside of or on top of the hose reel device. Indeed, in some embodiments, so long as the electronics 40 can communicate signals it receives to the flow controller 30, the electronics could practically be located anywhere. The important considerations to be made in deciding where to place the electronics 40 include those guiding principles pointed out in the present application, and those realized by one of ordinary skill in the art. For example, the arrangement in FIG. 4 has the benefit of placing one possible source of electricity, the electrical cord 120, at a significant distance from the inlet of the flow controller 30. This is advantageous because, when the electrically actuated valve 38 is closed, the inlet section of the flow controller 30 will still be experiencing the full pressure of substance in the hose. This inlet section of the closed flow controller 30 has a greater chance of leaking than the section of hose closer towards the nozzle. If the fluid is hazardous when combined with electricity (water or certain explosive gases, for example) it would be beneficial for the device to provide as much distance as possible between the primary source of electrical current and possible sources of leaks of the fluid.

While in many embodiments, the electronics 40 are contained within the flow controller 30, in some embodiments it may be advantageous to place certain aspects of the electronics in other locations. For instance, it may be advantageous to place the wireless receiver(s) external to any hose reel housing 112, in order to allow for certain remote control devices to reach the receiver more readily. Alternatively, it may be desirable to limit the amount of electronics in the flow controller 30; thus, the electronics may be placed elsewhere and connected to the electrically activated valve 38 via a wire which will carry a signal to open or close the valve. In one embodiment, the electronics 40 are primarily contained within the hose reel device 110. In another embodiment, the electronics 40 are contained in or on the hose reel housing 112. In a preferred embodiment, the electronics 40 are primarily contained in the flow controller 30.

While not illustrated, it will be understood that the hose reel preferably includes a mechanism to distribute the hose across the surface of the drum 116 as it winds, thereby avoiding tangling and maximizing efficiency. Most preferably, the hose reel device 110 employs a mechanism similar to that disclosed in U.S. Pat. No. 6,422,500 issued to Mead, Jr. on Jul. 23, 2002, and assigned to the assignee of the present application, the disclosure of which is incorporated herein by reference. In particular, that patent illustrates at FIGS. 8A and 8B and related text a method of distributing hose across the hose reel drum by relative rotation between a housing shell with a hose aperture and the cylindrical drum housed within. Mechanisms for linking the rotation of the cylindrical drum along the horizontal axis and the rotation of the surrounding shell can include the spiral groove as illustrated in the incorporated patent, or can include any of a number of other linkage systems.

In operation, the hose reel device 110 and flow controller 30 can be connected to a water faucet 10 and placed at any convenient position. When not in use, the second section of hose 16b is wound upon the hose reel drum 116 with perhaps only the nozzle 22 protruding from the hose reel housing 112. The flow controller 30 is preferably in an off position during non-use, such that there is less pressure in the second section of hose 16b during non-use than during use, although the spigot at the faucet 10 may be left open. There is thus minimum risk of leakage, at least upstream of the flow controller 30, and the hose section 16b readily winds upon the drum and can be slightly compressed, depending upon the nature of the hose. In another embodiment, while there is little pressure in section 16b of the hose while the hose is not being used, in order to assist the unwinding of the hose, the pressure in section 16b may be increased, thus inflating the hose and assisting in the unwinding of the hose. This may be achieved by opening the electrically actuated valve, at least partially. As will be appreciated by one of skill in the art, in the embodiment described by FIG. 4, this pre-inflating of the hose may lead to water leaving the hose before the water is needed by the user. However, a second flow controller may be placed further downstream towards the nozzle 22, or manual controls may be in place at the nozzle as well.

In one embodiment, multiple flow controllers may be employed along a length of hose, for many reasons, the main two being that there may be multiple flow outlets, or because particular characteristics of hose properties may be desired in particular sections of a hose.

When it is desired to operate the hose, the user can pull upon the nozzle 22 and freely unwind the hose from the drum 116. In other arrangements, the motor 114 can be actuated (e.g., by use of the remote control 50) to automatically splay out and unwind the hose. When the user has pulled the hose sufficiently and has reached a position where he would like to apply the fluid, the user employs the remote control 50 to open the flow control valve 38 in the flow controller 30. Since the spigot 14 is already open, there is no need to travel to the faucet 10, which may be difficult to reach or where there is likely to be muddiness from dripping water, in order to turn on the hose. Nor does water flow freely during such a special trip to the faucet 10 between the time of turning on the faucet and returning to the nozzle, even in the situation where no manually actuated nozzle attachment is used. Rather, the user is already in position and holding the nozzle when the water flow is actuated. Furthermore, the user need not return to the faucet 10 in order to shut the water off, but would rather simply use the remote control 50 to shut the water flow off at the flow controller 30.

As appreciated by one of skill in the art, in some embodiments, the particular arrangements described above result in situations in which the chance the fluid flowing through the hose, coming into contact with any electrical current, is greatly reduced. However, it may still be beneficial to effectively seal many of the components that use electricity in order to further reduce any risk.

It will be appreciated by those skilled in the art that various omissions, additions, and modifications may be made to the methods and structures described above without departure from the scope of the invention. All such modifications and changes are intended to fall within the scope of the invention, as defined by the appended claims.

We claim:

1. A hose control system comprising:
   a flow controller including an inlet, an outlet, a fluid flow path defined between the inlet and outlet, and an electrically actuated valve positioned to selectively close the fluid flow path, wherein the inlet and the outlet of the flow controller are configured to mate with ends of hose sections;
   a hose reel device in fluid communication with the outlet of the flow controller, the hose reel device comprising a rotatable reel onto which a hose can be spooled, and an electrical motor connected to rotate the reel;
   electronic components in communication with said valve and said motor, the electronic components comprising:
      a wireless receiver configured to receive wireless command signals for controlling the valve and the motor, the wireless receiver being capable of receiving the wireless signals only when the wireless receiver is in a powered state, the electronic components configured to convey electrical power to drive the valve and the motor, and
      a power control unit configured to repeatedly switch the wireless receiver between powered and unpowered states in a cycle; and
   a remote control comprising manual controls and a wireless transmitter, the wireless transmitter configured to transmit command signals to the wireless receiver for controlling the valve and the motor, the manual controls connected to the wireless transmitter to permit control of the wireless transmitter.

2. The hose control system of claim 1, wherein the wireless receiver is integrated with the flow controller.

3. The hose control system of claim 1, wherein the electronic components include integrated circuit (IC) chips.

4. The hose control system of claim 1, wherein the wireless receiver is a radio frequency (RF) receiver.

5. The hose control system of claim 1, wherein the electronic components further comprise an electronic logic unit configured to receive the wireless command signals from the wireless receiver and process said command signals to control the valve and the motor.

6. The hose control system of claim 5, wherein the logic unit comprises an IC decoder unit.

7. The hose control system of claim 1, wherein the electronic components are configured to position the valve at any of a plurality of positions between a completely closed position in which the fluid flow path is completely closed and a completely open position in which the fluid flow path is completely open.

8. The hose control system of claim 1, wherein the inlet of the flow controller is configured to mate with an outlet of a water faucet, the outlet being configured to mate with a hose.

9. The hose control system of claim 1, further comprising a water hose having a proximal end in fluid connection with the outlet of the flow controller, the remote control being mounted proximate a distal end of the hose.

10. The hose control system of claim 1, wherein the manual controls of the remote control comprise one or more motor controls for transmitting command signals to the wireless receiver for controlling the motor, and one or more valve controls for transmitting command signals to the wireless receiver for controlling the valve.

11. The hose control system of claim 1, wherein the wireless receiver comprises a detection unit configured to detect and receive wireless command signals and an electronic logic unit configured to receive the command signals from the detection unit, the logic unit further configured to process said command signals to control at least one of the motor and the valve, wherein the power control unit is configured to keep the logic unit in an unpowered state until the wireless receiver receives a wireless signal.

12. The hose control system of claim 1, wherein the power control unit comprises an operational amplifier.

13. The hose control system of claim 1, wherein the wireless receiver comprises a radio frequency (RF) receiver.

14. The hose control system of claim 1, wherein the power control unit is configured to keep the wireless receiver in its unpowered state for no more than a set time period during each cycle, and wherein the remote control is configured so that each signal is transmitted for a duration at least as long as said set time period.

15. The hose control system of claim 1, wherein the rotatable reel comprises a cylindrical drum.

16. A hose control system, comprising:
   a flow controller having an inlet, an outlet, a fluid flow path defined between the inlet and outlet, and an electrically actuated valve positioned to selectively close the fluid flow path;
   a rotatable hose reel onto which a hose can be spooled;
   an electrically controllable motor connected to rotate the reel;
   electronic components in communication with said valve and said motor, wherein said electronic components comprise:
      a wireless receiver being capable of receiving the wireless signals only when the wireless receiver is in a powered state, and
      a power control unit configured to repeatedly switch the wireless receiver between powered and unpowered states in a cycle; and
   a remote control configured to transmit a wireless command signal to the wireless receiver for controlling the motor and opening and closing the valve, wherein the remote control is configured so that a single command from the remote control both moves the valve to close the fluid flow path and operates the motor to rewind the reel onto which a hose can be spooled.

17. The hose control system of claim 1, wherein the power control unit keeps the wireless receiver in its powered state between about 2-20% of the time of the cycle.

18. The hose control system of claim 17, wherein the power control unit keeps the wireless receiver in its powered state between about 3-10% of the time of the cycle.

19. The hose control system of claim 16, wherein the wireless receiver is integrated with the flow controller.

20. The hose control system of claim 16, wherein the electronic components are configured to position the valve at any of a plurality of positions between a completely closed position in which the fluid flow path is completely closed and a completely open position in which the fluid flow path is completely open.

21. The hose control system of claim 16, wherein the inlet of the flow controller is configured to mate with an outlet of a water faucet, the outlet being configured to mate with a hose.

22. The hose control system of claim 16, wherein the inlet and the outlet of the flow controller are configured to mate with ends of hose sections.

23. The hose control system of claim 16, further comprising a water hose having a proximal end in fluid connection with the outlet of the flow controller, the remote control being mounted proximate a distal end of the hose.

24. The hose control system of claim 16, wherein the power control unit keeps the wireless receiver in its powered state between about 2-20% of the time of the cycle.

25. The hose control system of claim 24, wherein the power control unit keeps the wireless receiver in its powered state between about 3-10% of the time of the cycle.

26. The hose control system of claim 16, wherein the power control unit is configured to keep the wireless receiver in its unpowered state for no more than a set time period during each cycle, and wherein the remote control is configured so that each of the wireless signals is transmitted for a duration at least as long as said set time period.

27. A method comprising:
repeatedly switching a wireless receiver between powered and unpowered states in a cycle, the wireless receiver configured to receive wireless signals from a remote control, wherein the wireless receiver is capable of receiving the wireless signals only when the wireless receiver is in its powered state,
transmitting a wireless command signal from a remote control to the wireless receiver, and in response to the wireless receiver receiving the wireless command signal from the remote control while the wireless receiver is in its powered state, ceasing to switch the wireless receiver to its unpowered state;
closing a valve to prevent fluid flow through a hose system in accordance with said wireless command signal; and
rewinding a hose reel device in accordance with said wireless command signal.

28. The method of claim 27, wherein closing a valve comprises closing an electrically actuated valve, and wherein rewinding a hose reel device comprises controlling an electric motor.

29. The method of claim 27, further comprising keeping the wireless receiver in its powered state between about 2-20% of the time of the cycle.

30. The method of claim 29, further comprising keeping the wireless receiver in its powered state between about 3-10% of the time of the cycle.

31. The method of claim 27, further comprising:
keeping an electronic logic unit in an unpowered state, the electronic logic unit configured to receive command signals from the wireless receiver and process said signals to control at least one of the motor and the valve;
in response to the wireless receiver receiving a wireless signal, switching the logic unit to a powered state.

32. The method of claim 27, wherein the wireless command signal lasts for a duration at least as long as a set time period; the method further comprising keeping the wireless receiver in its unpowered state for no more than said set time period during each cycle.

33. A hose control system comprising:
a flow controller including an inlet, an outlet, a fluid flow path defined between the inlet and outlet, and an electrically actuated valve positioned to selectively close the fluid flow path, wherein the inlet of the flow controller is configured to mate with an outlet of a water faucet, the outlet being configured to mate with a hose;
a hose reel device in fluid communication with the outlet of the flow controller, the hose reel device comprising a rotatable reel onto which a hose can be spooled, and an electrical motor connected to rotate the reel;
electronic components in communication with said valve and said motor, the electronic components comprising:
a wireless receiver configured to receive wireless command signals for controlling the valve and the motor, the wireless receiver being capable of receiving the wireless signals only when the wireless receiver is in a powered state, the electronic components configured to convey electrical power to drive the valve and the motor, and
a power control unit configured to repeatedly switch the wireless receiver between powered and unpowered states in a cycle; and
a remote control comprising manual controls and a wireless transmitter, the wireless transmitter configured to transmit command signals to the wireless receiver for controlling the valve and the motor, the manual controls connected to the wireless transmitter to permit control of the wireless transmitter.

34. A hose control system comprising:
a flow controller including an inlet, an outlet, a fluid flow path defined between the inlet and outlet, and an electrically actuated valve positioned to selectively close the fluid flow path;
a hose reel device in fluid communication with the outlet of the flow controller, the hose reel device comprising a rotatable reel onto which a hose can be spooled, and an electrical motor connected to rotate the reel;
electronic components in communication with said valve and said motor, the electronic components comprising:
a wireless receiver configured to receive wireless command signals for controlling the valve and the motor, the wireless receiver being capable of receiving the wireless signals only when the wireless receiver is in a powered state, the electronic components configured to convey electrical power to drive the valve and the motor, and
a power control unit configured to repeatedly switch the wireless receiver between powered and unpowered states in a cycle;
a remote control comprising manual controls and a wireless transmitter, the wireless transmitter configured to transmit command signals to the wireless receiver for controlling the valve and the motor, the manual controls connected to the wireless transmitter to permit control of the wireless transmitter; and
a water hose having a proximal end in fluid connection with the outlet of the flow controller, the remote control being mounted proximate a distal end of the hose.

* * * * *